United States Patent [19]

Sato

[11] 3,942,182

[45] Mar. 2, 1976

[54] RECORDING DEVICE

[75] Inventor: Reiji Sato, Yokohama, Japan

[73] Assignee: Amano Corporation, Yokohama, Japan

[22] Filed: Dec. 24, 1974

[21] Appl. No.: 536,215

[30] Foreign Application Priority Data

Dec. 26, 1973 Japan .............................. 49-517[U]

[52] U.S. Cl. ...................................... 346/53; 346/82

[51] Int. Cl.[2] ...................... G01D 9/36; G01D 15/02

[58] Field of Search ................................ 346/53, 82

[56] References Cited

UNITED STATES PATENTS

| | | | |
|---|---|---|---|
| 3,341,852 | 9/1967 | Kramer et al. | 346/53 X |
| 3,419,881 | 12/1968 | Yamamoto et al. | 346/53 X |
| 3,573,848 | 4/1971 | Ward | 346/82 |

FOREIGN PATENTS OR APPLICATIONS

| | | | |
|---|---|---|---|
| 1,204,435 | 11/1965 | Germany | 346/82 |

*Primary Examiner*—L. T. hix
*Assistant Examiner*—Stanley J. Witkowski
*Attorney, Agent, or Firm*—Hans Berman

[57] ABSTRACT

A recording time clock whose housing has an orifice for insertion of a time card and another orifice in which a punched coding plate may be inserted. A reading device reads the code of perforations in the coding plate and sets a code printing wheel in the printing mechanism of the clock for printing a code symbol simultaneously with the hour and minute on an inserted time card.

5 Claims, 12 Drawing Figures

RECORDING DEVICE

SUMMARY OF INVENTION

This invention relates to recording time clocks, and particularly to a time clock in which a code symbol indicative of overtime or other special working conditions is recorded on an inserted time card.

It was known heretofore to indicate overtime and like special working hours on a time card by printing indicia in special colors or in special columns of the card. The known methods, however, readily lead to abuse unless a guard is stationed at the recording time clock to prevent workers from recording special working time for regular time. The problem is particularly severe when workers are free to elect their starting and leaving times.

It is an object of the invention to identify the time recorded on a time card by a special symbol and to prevent abuse of this symbol.

According to the invention, a recording time clock is provided with a photoelectric reading device. It reads perforations on a plate member inserted in a receptacle of the recording time clock which is equipped with a printing device responsive to the presentation of a time card for printing an indication of time on the card. A recording device records the reading signal of the reading device on a time card presented to the printing device while the perforated plate member is inserted in the receptacle.

The invention will be understood more fully from the following description of a preferred embodiment when considered in connection with the attached drawing.

DETAILED DESCRIPTION OF INVENTION

Figure 1:
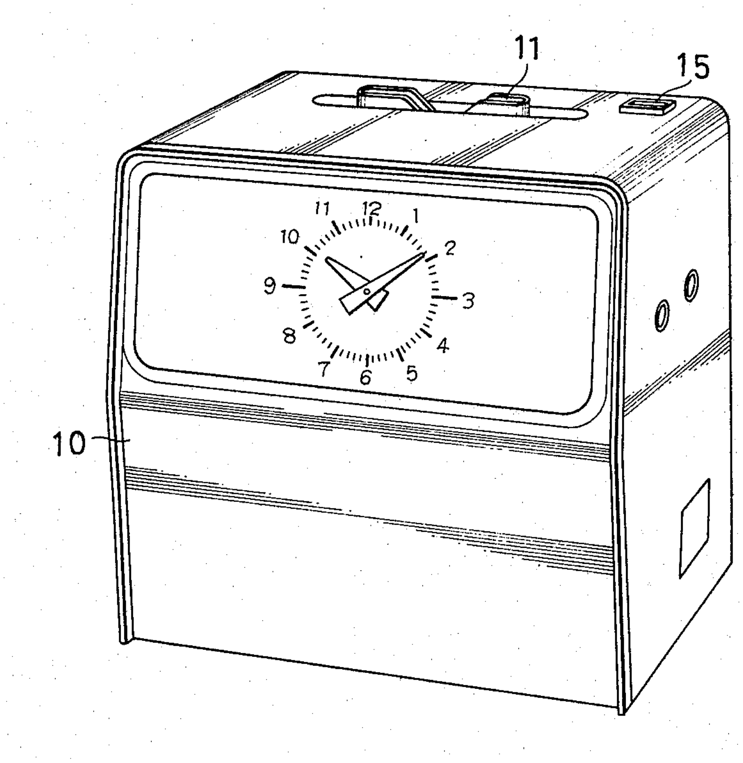
FIG. 1 shows a recording clock of the invention in a perspective view.

FIG. 1 shows the housing 10 of a time clock of the invention. Raised rims 11, 15 projecting from the housing 10 bound orifices for insertion of time cards and coding plates respectively. As is seen in FIGS. 2A and 2B, the rim 11 is the enlarged top portion of a guide 12 suspended in the housing 10 between a printing wheel 23 and a printing hammer 13.

Figure 2B:
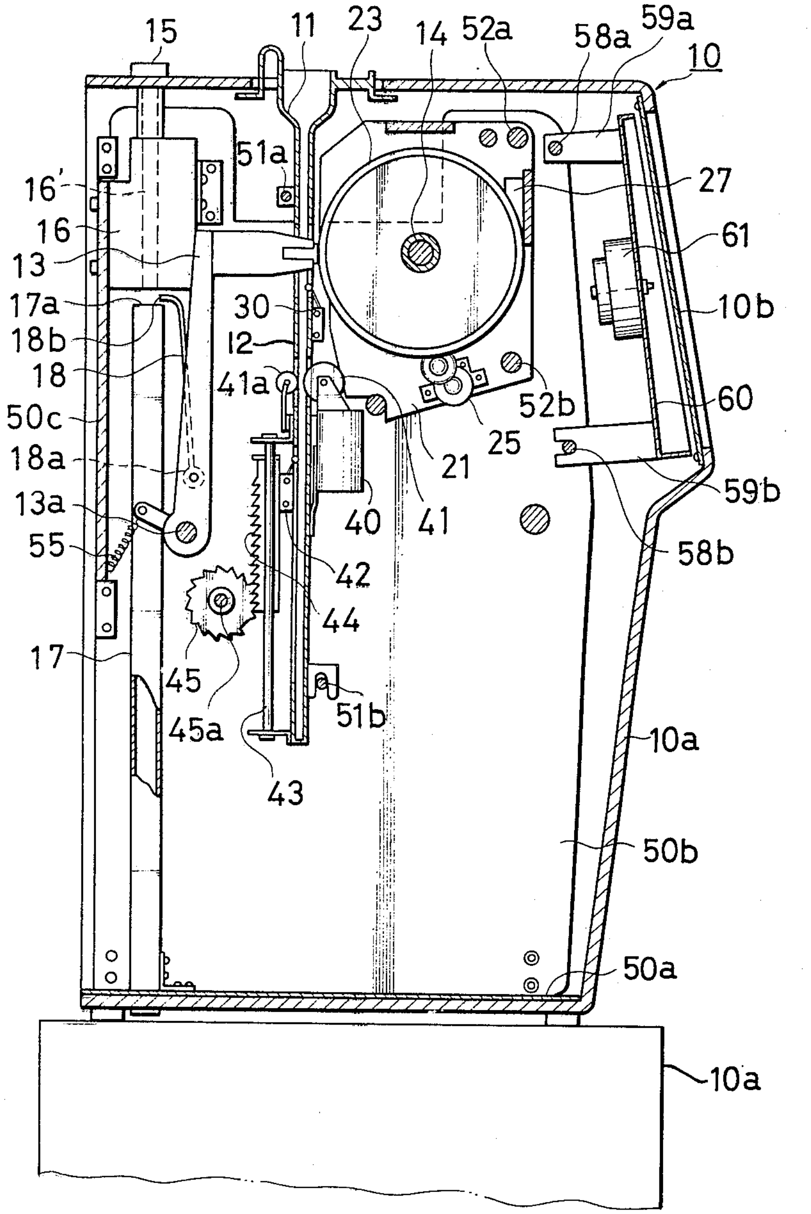
FIG. 2B shows the clock and its casing in section on the line Z — Z in FIG. 2A.
Figure 2A:
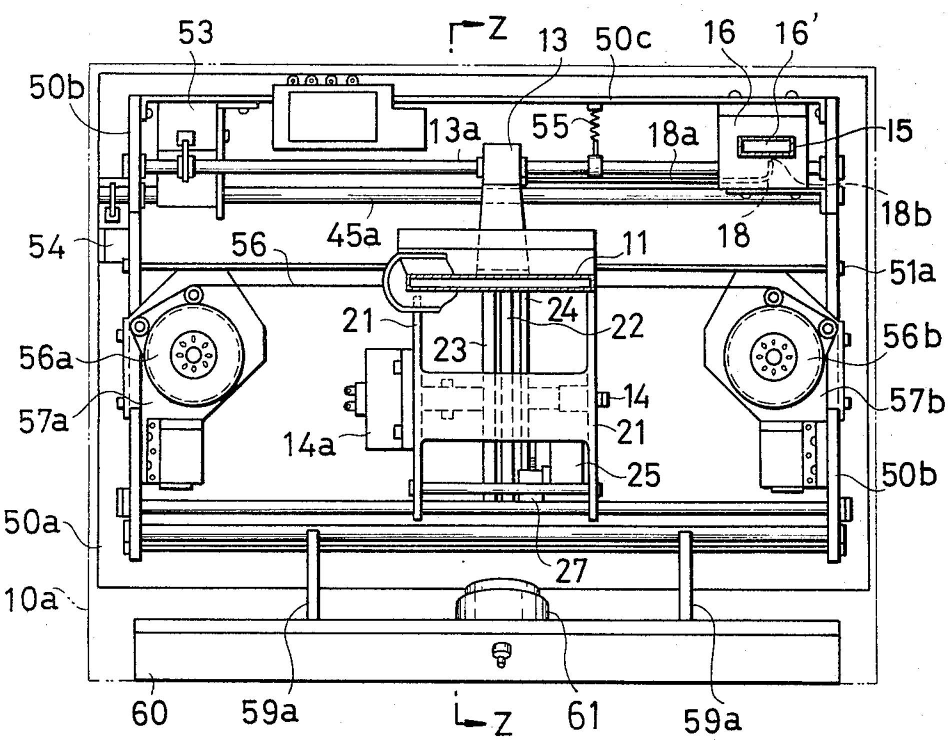
FIG. 2A shows the clock of FIG. 1 in a plan view without its casing.

The hammer 13 is mounted on an operating shaft 13a and may be pivoted by the shaft into the printing position shown in FIG. 2B adjacent the wheel 23. The wheel 23 is one of a group of printing wheels mounted on a common shaft 14.

The rim 15 leads into a vertical passage 16′ in a reading device 16, the passage being aligned with the top opening 17a of a vertical chute 17. The chute leads into a storage space in a cabinet 10*a* on which the clock is mounted.

The long arm of an L-shaped stop 18 is secured to the hammer 13 by a pin 18*a*. The short arm 18*b* of the stop is located between the bottom orifice of the passage 16′ and the opening 17*a* of the chute 17 when the hammer 13 is returned to its inoperative position by a return spring 55, thereby forming the bottom of a receptacle for an inserted coding plate.

Figure 3:
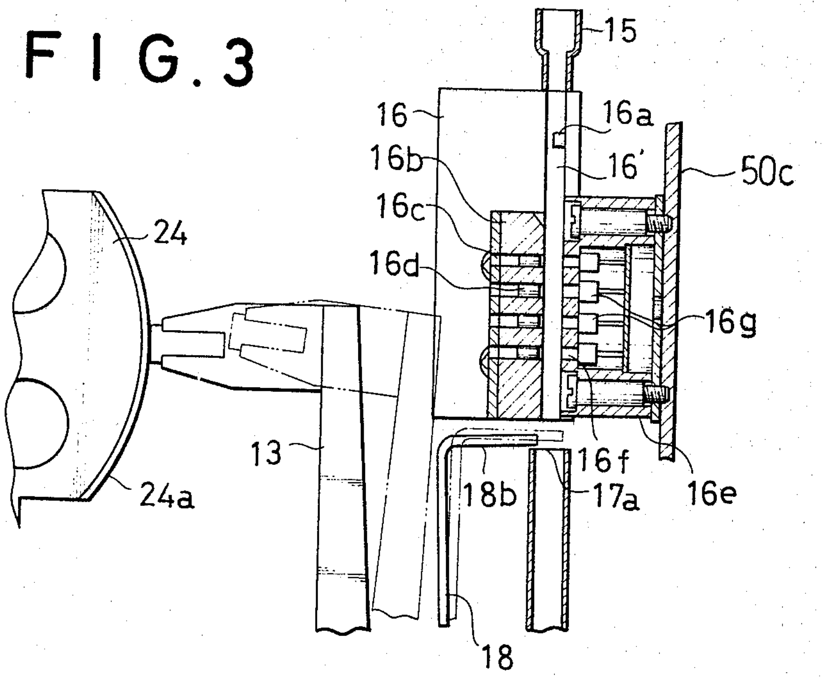
FIG. 3 shows elements of the clock in fragmentary side elevation and partly in section.

The reading device 16, best seen in FIG. 3, has a guide pin 16*a* projecting into the passage 16′. One side of the passage 16′ is defined by a block 16*b* formed with two vertical rows of four horizontal bores 16*c*, each bore receiving a light-emitting diode 16*d* as a light source. The bores of the second row, not shown, are horizontally aligned with the illustrated bores 16*c*. A block 16*e* separated from the block 16*b* by the passage 16′ is formed with eight bores 16*f* respectively aligned with the bores 16*c* and containing phototransistors 16*g*.

Figure 6A:
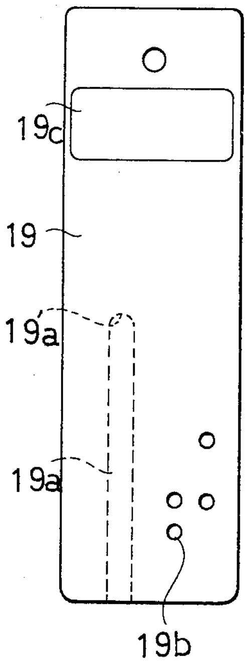
FIG. 6A is a front view of a coding plate for use in the clock.
Figure 6B:
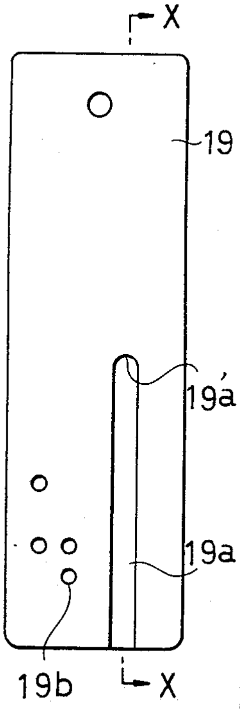
FIG. 6B shows the plate of FIG. 6A in rear view.
Figure 6C:
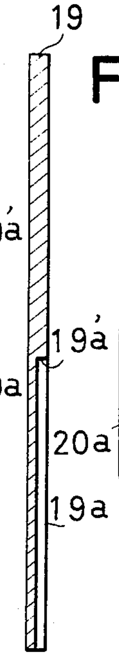
FIG. 6C shows the plate of FIG. 6B in section on the line X — X.

The elongated coding plate 19 shown in FIGS. 6A to 6C fits the passage 16′ when a groove 19*a* in the back of the plate faces the guide pin 16*a*. The plate may be inserted to such a depth that the pin 16*a* abuts against a transverse end wall 19*a′* of the groove 19*a*. In this position, approximately one third of the plate still projects upward from the rim 15, and the plate is prevented from dropping into the chute 17 even when the stop 18 is moved into the releasing position shown in FIG. 2B. Perforations 19*b* in the plate permit the light of selected diodes 16*d* to reach the aligned phototransistors, whereby the latter emit a code signal. A shield 19*c* on the plate 19 may display the meaning of the code.

Figure 7A:
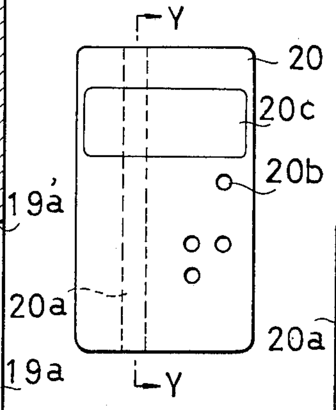
FIGS. 7A and 7B illustrate another coding plate in views respectively corresponding to those of FIGS. 6A and 6C.
Figure 7B:
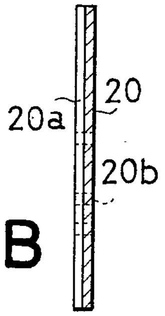

Another coding plate 20, about one half of the length of the plate 19, is shown in FIGS. 7A and 7B. A groove 20*a* adapted movably to receive the pin 16*a* extends over the entire length of the plate 20. The plate 20, when inserted in the rim 15, rests on the short arm 18*b* of the stop 18 and drops into the chute 17 after the stop moves into the position seen in FIG. 2B during the printing stroke of the hammer 13. No part of the plate 20 projects from the clock after insertion. The plate is provided with perforations 20*b* and a shield 20*c* for transmitting and for displaying a code, as described above.

Figure 4:
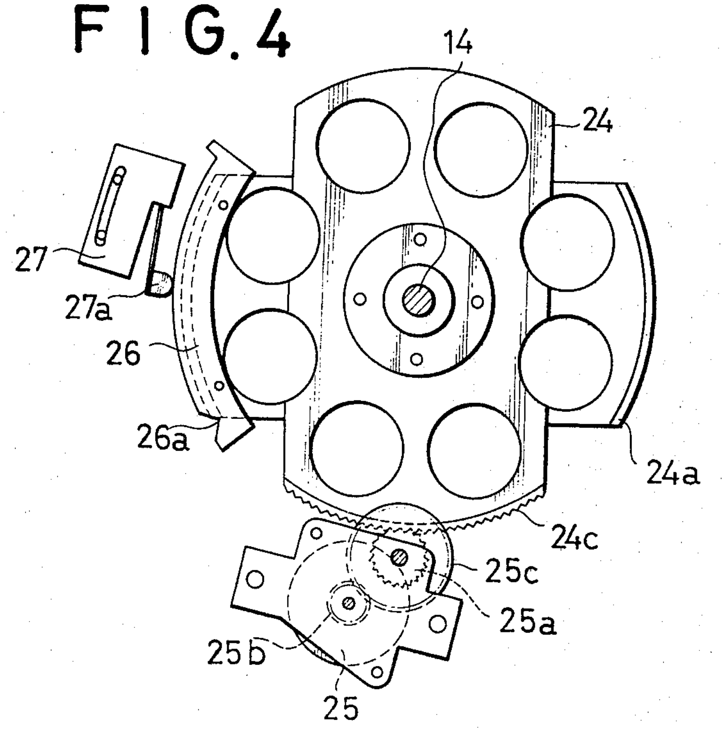
FIG. 4 illustrates further elements of the clock in partly sectional side elevation.
Figure 5:
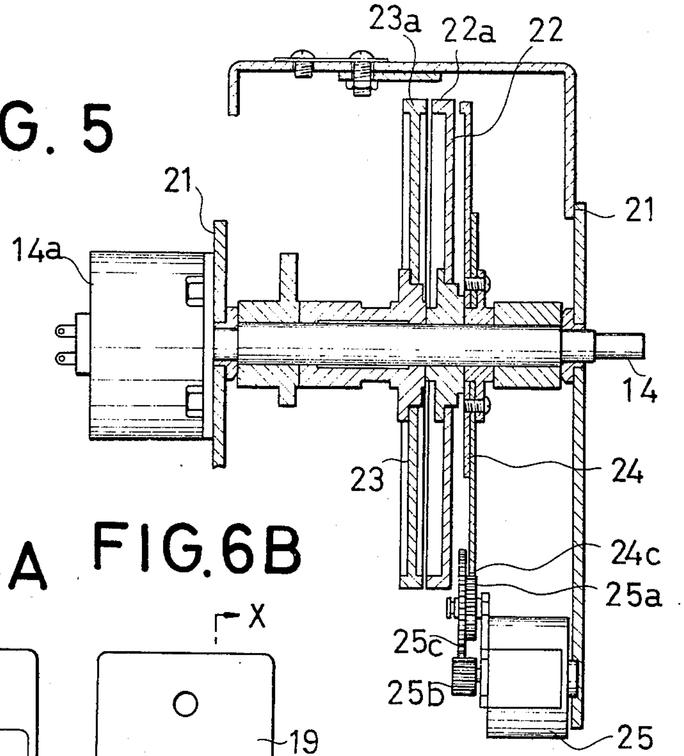
FIG. 5 shows the apparatus of FIG. 4 in partly sectional front elevation.

As is best seen in FIGS. 4 and 5, the shaft 14 is journaled in a frame 21 mounted in the housing 10 and is turned in uniform steps by a motor 14*a* once every minute. A minute wheel 22 mounted on the shaft 14 has a circumferential face 22*a* carrying raised type numerals 00 to 59, not specifically illustrated. The wheel 23 correspondingly carries a circumferential row of type numerals 0 to 23 and is advanced one step after each full revolution of the minute wheel 22 which takes 1 hour. A code printing wheel 24 is rotatably mounted on the shaft 14, and its circumference is divided by radial notches into four segments. One segment 24*a* carries a row of ten capital code letter types on its circumference. A second segment 24*c* is toothed and meshes with a pinion 25*a* on a gear wheel 25*c* which in turn is driven by a pinion 25*b* on the output shaft of a pulse motor 25 mounted on the frame 21. Rotation of the segment 24c by the motor 25 is limited to a quarter of a turn.

The motor 25 turns the wheel 24 to a position in which the code letter on the segment 24a corresponding to the perforations 19b, 20b of a plate in the reading device 16 faces the hammer 13, as will presently be described.

A third segment of the wheel 24 carries a cam 26 whose face is generally circular about the axis of rotation and has a notch 26a at one end. A microswitch 27 in the energizing circuit of the motor 25 has an actuating member 27a which travels over the cam 26. The switch 27 shuts the motor 25 off when the member 27a drops into the notch 26a.

Figure 8:
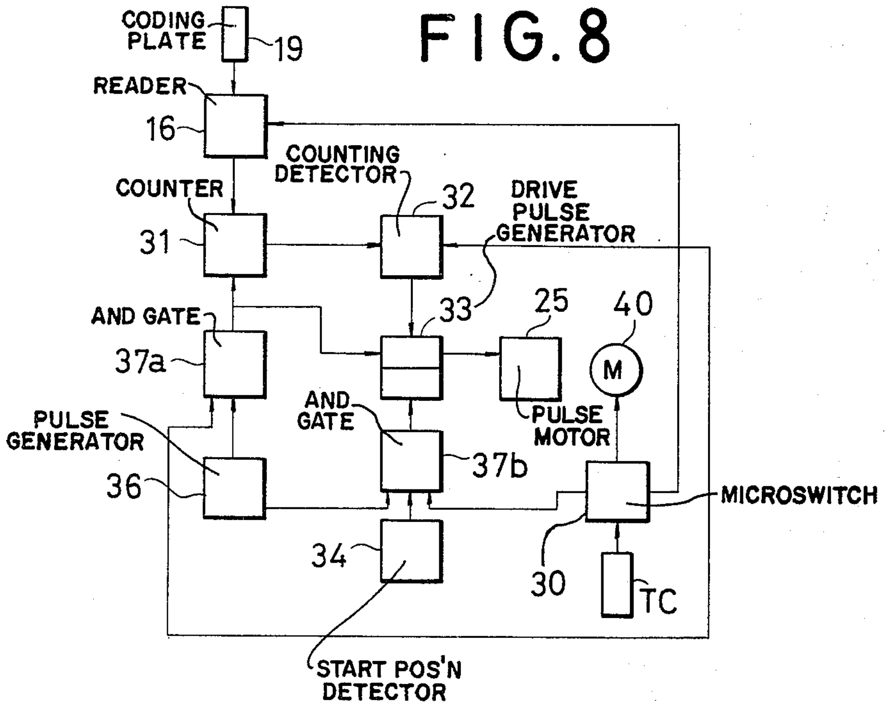
FIG. 8 is a diagram of the electric circuit in the clock.

The apparatus described so far is operated by means of an electric circuit shown in FIG. 8 and by additional elements shown in FIGS. 2A and 2B.

A long coding plate 19 is inserted in the reading device 16 when a group of workers, such as an entire shift, works overtime or performs other unusual work, and the plate remains in the recorder until all workers of the group have printed the time and the appropriate code on their time cards inserted into the guide 12. Individual workers are given short coding plates 20 for indicating a code on their time card, and such coding plates 20 can be used only once by the worker and are retained in the storage space of the clock.

A microswitch 30 near the rim 11 energizes the diodes 16d in the reading device 16 when a time card (TC) is inserted in the rim 11. The signals thereafter emitted by the phototransistors 16g are fed as a numerical value to the input of a counter 31. The count is detected by a counting value detector 32 and transmitted to a drive pulse generator 33. The pulse signal from the generator 33 is fed to the pulse motor 25 for positioning the wheel 24 in accordance with the code represented by the perforations of the inserted coding plate 19, 20.

As described in more detail in my copending application Ser. No. 429,405, filed on Dec. 28, 1973, now U.S. Pat. No. 3,878,516, the microswitch 30 also energizes a motor 40 which drives a card feeding roller 41 cooperating with a pressure roller 41a for drawing an inserted time card downward into the guide 12. The card then strikes a second microswitch 42 mounted on a rack 44 which may be raised along a guide rod 43 by a gear 45 on a shaft 45' to position the proper line of the time card between the hammer 13 and the printing wheels of which only the hour wheel 23 is seen in FIG. 2B.

The actuated microswitch 42 reverses the motor 40 and energizes the drive for the hammer 13. Upon completion of the printing step, the pulse motor 25 is reversed by a signal from a start position detector 34 (FIG. 8) mainly consisting of the microswitch 27 (FIG. 4) to the drive pulse generator 35 when the microswitch 30 is released by the time card being withdrawn from the clock. The wheel 24 is moved back toward the starting position until the actuator 27a drops into the notch 26a, and the motor 25 is stopped.

The timing pulses for the circuit shown in FIG. 8 are derived from a clock pulse generator 36 and introduced into the circuit through AND gates 37a, 37b.

The operating elements and the housing 10 of the recording time clock are carried by a supporting structure including a base plate 50a, two side plates 50b, and a back plate 50c, the side plates being connected by mounting rods 51a, 51b, 52a, 52b, 58a, 58b.

The supporting structure also carries the solenoid 53 which turns the shaft 13a of the hammer 13, and the solenoid 54 which advances the gear 45 by the one tooth per day. Brackets 57a, 57b on the side plates 50b carry the spools 56a, 56b for the inked ribbon 56 of the printing mechanism.

A dial 60 is visible in the front of the clock housing 10 behind a glass window 10b. It is mounted between the rods 58a, 58b on brackets 59a, 59b, and its back carries a clockwork drive 61.

What is claimed is:

1. A recording device comprising:

a. a support carrying a first receptacle and a second receptacle;

b. printing means mounted on said support and responsive to insertion of a time card in said first receptacle for printing an indication of time on the inserted time card;

c. reading means mounted on said support and responsive to insertion into said second receptacle of a plate member formed with a perforation for reading said perforation and for generating a reading signal in response to the reading of said perforation; and d. recording means mounted on said support and operatively connected to said reading means for recording said reading signal on said inserted time card while said plate member is inserted in said receptacle.

2. A device as set forth in claim 1, further comprising means in said second receptacle for limiting the depth of insertion of said plate member to a predetermined value, whereby a plate member shorter than said predetermined value is entirely received in said receptacle, and a plate member longer than said predetermined value projects from said receptacle when inserted, and means responsive to said recording of said reading signal for selectively storing said shorter plate member.

3. A device as set forth in claim 1, further comprising a housing mounted on said support and enclosing said printing means, said receptacles, and said recording means, said housing being formed with two openings for insertion of said time card and of said plate member into said printing means and receptacles respectively, said printing means including a first type carrier carrying a plurality of types indicative of a time, and said recording means including a second type carrier carrying a type indicative of said read perforation and juxtaposed to said first carrier, said printing and recording means further including hammer means for simultaneously printing an impression of respective types of said first and second carriers on an inserted time card.

4. A device as set forth in claim 3, wherein said type carriers are mounted for angular displacement relative to a common axis in axially juxtaposed relationship, the types of said first carrier being arranged in a circular arc about said axis.

5. A device as set forth in claim 4, wherein said reading signal is indicative of the position of said perforation on said plate member, said type on said second carrier is one of a plurality of types carried by said second carrier and respectively associated with different positions of said perforation on said plate member, the types on said second carrier being arranged in a circular arc about said axis, said printing means further including a clock pulse generator and actuating means for angularly moving said first carrier in response to a time signal generated by said clock pulse generator, and said recording means further including means for angularly moving said second carrier in response to said reading signal.

* * * * *